Jan. 9, 1968 J. A. LITTLE 3,362,718
SHAFT SEALING MEANS INCORPORATING RADIAL BAFFLES
FOR TRAPPING OIL AND THE LIKE
Filed Jan. 17, 1964 2 Sheets-Sheet 1

INVENTOR
JOHN A. LITTLE

BY *Larson and Taylor*

ATTORNEYS

INVENTOR
JOHN A. LITTLE
BY Larson and Taylor
ATTORNEYS

United States Patent Office 3,362,718
Patented Jan. 9, 1968

3,362,718
SHAFT SEALING MEANS INCORPORATING
RADIAL BAFFLES FOR TRAPPING OIL
AND THE LIKE
John A. Little, North Shields, England, assignor to C. A.
Parsons & Company, Limited, Newcastle-upon-Tyne,
England, a corporation of Great Britain
Filed Jan. 17, 1964, Ser. No. 338,461
Claims priority, application Great Britain,
Jan. 30, 1963, 3,874/63
9 Claims. (Cl. 277—19)

This invention relates to shaft sealing arrangements, and more particularly relates to such arrangements for preventing or reducing the contamination of gas in an enclosure by oil or other fluid being conveyed along a rotating shaft passing through or associated with the enclosure.

In many instances, for example, in gas circulators for nuclear reactors, it is important to prevent contamination of the gas by oil or other fluid used for sealing the enclosure where a circulator shaft passes therethrough or by oil used in bearings associated with the circulator shaft. A common type of shaft seal for such circulators is a thrust collar type of seal in which a sealing ring is urged against a collar on the shaft so that a sealing face on the ring engages the face of the collar. Oil is fed to the faces of the sealing ring and collar through an opening in the sealing face of the sealing ring. Part of this oil flows radially outward between the two surfaces and is collected in a chamber surrounding the seal. The other part flows radially inward towards the shaft and collects in a space surrounding the shaft. In those applications where the sealing ring is on the same side of the collar as the gas enclosure, it is the oil leaking radially inwardly that can pass along the shaft and contaminate the gas, while in those applications where the sealing ring is on the side of the collar remote from the gas enclosure it is the oil leaking radially outwardly that is likely to pass along the shaft and contaminate the gas in the enclosure.

In order to prevent or reduce such contamination of the gas by sealing oil or other fluid, it has hitherto been the practice to provide labyrinth glands or seals between the gas enclosure and the seal, but the effectiveness of these glands is inversely proportional to the gas pressures in the enclosures. In other words, as the gas pressures in the enclosures increase, the effectiveness of such labyrinth glands or seals decreases. At least at increased pressures, an objectionable amount of oil or other sealing fluid still passes along the shaft to contaminate the enclosed gas.

The general object of the instant invention is to provide improved means for preventing or reducing the contamination of gas in an enclosure through which a rotating shaft passes by oil or other fluid used in the seals or in bearings associated with the shaft.

Generally the invention comprises a shaft sealing structure for minimizing the passage of fluid along a rotating shaft, the structure having a housing through which a rotary shaft passes and a plurality of radial baffles supported in the housing and lying in planes extending substantially in the direction of the axis of the housing, the radially inner edges of the baffles being disposed in the housing so as to lie in close proximity to the periphery of a shaft which may pass through the housing, and means are provided for collecting oil or other fluid trapped by the baffles.

The invention also comprises a shaft sealing structure as set forth in the preceding paragraph in which one or more labyrinth glands or seals are carried by the housing for sealingly cooperating with the rotary shaft passing through the housing.

The invention further comprises a shaft sealing structure for minimizing the passage of fluid along a rotating shaft, the structure comprising a housing having a longitudinal passage therethrough for receiving a rotary shaft, a sealing ring carried by the housing and having a sealing face adapted for sealing engagement with a corresponding surface on a shaft passing through the housing, means for supplying a sealing fluid to the sealing face of the sealing ring, and a plurality of radial baffles supported in the housing and lying in planes extending substantially in the direction of the axis of the longitudinal passage of the housing, the radially inner edges of the baffles being disposed in the housing so as to lie in close proximity to the periphery of a shaft passing through the longitudinal passage of the housing.

The invention still further comprises a shaft sealing structure in accordance with the preceding paragraph wherein the sealing face of the sealing ring faces transversely to the axis of the longitudinal passage so as to be sealingly engageable with a corresponding transversely disposed face on a collar of a shaft passing through the housing.

Finally, the invention comprises a shaft sealing structure in accordance with the preceding paragraph having at least one labyrinth seal adjacent to the sealing ring and adapted to sealingly engage a transversely disposed face on a collar of a shaft passing through the housing at a point between the sealing face and the baffles, at least some of the radial baffles being disposed so as to lie around the periphery of the thrust collar.

Other and further objects, advantages and features of the invention will be apparent to those skilled in the art from the following description considered with reference to the accompanying drawings, wherein.

Figure 1:
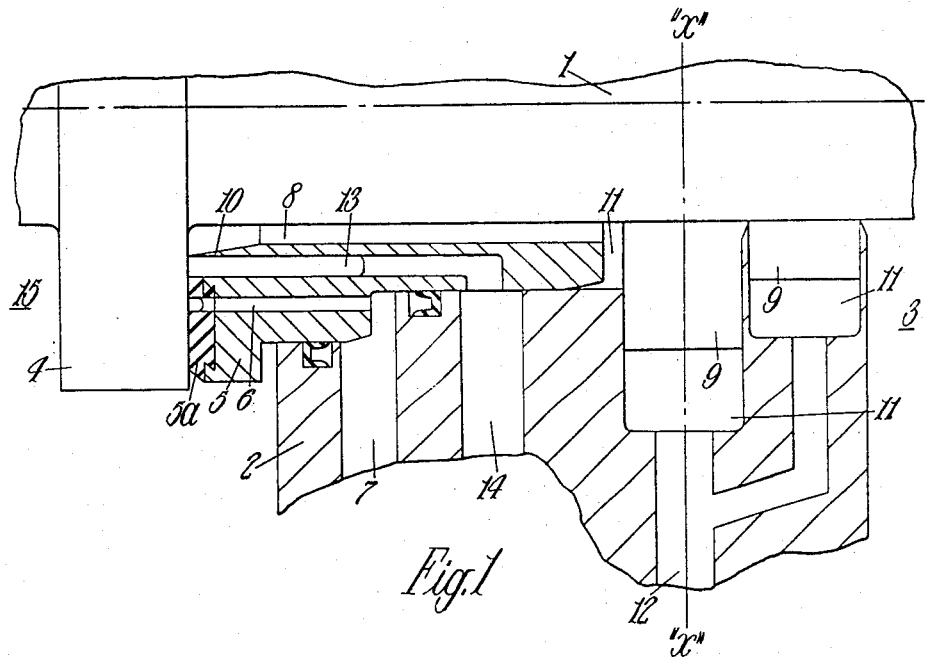
FIG. 1 is a fragmentary section of a sealing arrangement for a rotating shaft which passes through a sealed enclosure containing a gas.
Figure 2:
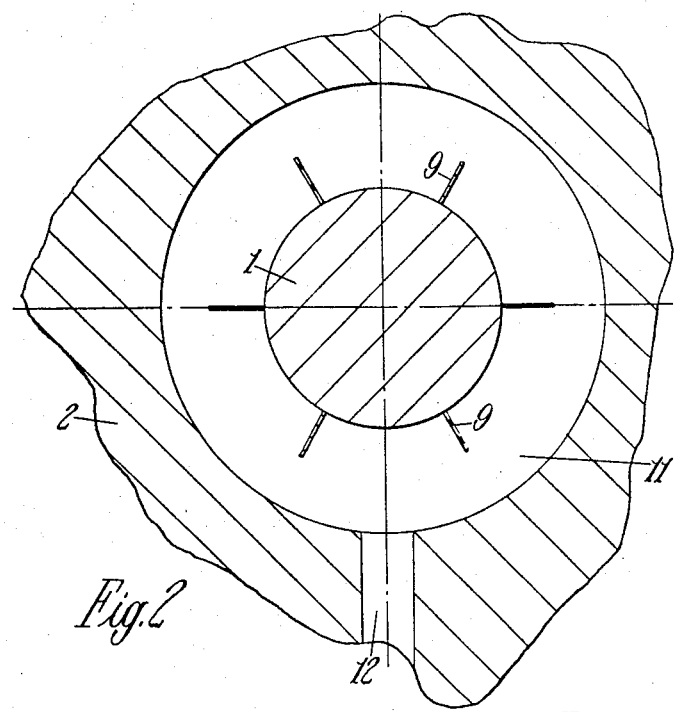
FIG. 2 is a section view taken on line X—X of FIG. 1, or equivalent planes in FIGS. 3 and 4 referred to below.

Referring now to the embodiments of the invention illustrated in the drawings by way of example, FIGS. 1 and 2 illustrate a simple and preferred embodiment of the invention. Referring to FIGS. 1 and 2, a rotating shaft 1 passes through a wall 2 of an enclosure which houses a gas in space 3, contamination of which gas by oil or other fluid from seals or bearings is to be avoided or kept to a minimum. Escape of gas from the enclosure is prevented or reduced by a gas seal of the thrust collar type specified above. This seal comprises a thrust collar 4 integral or fixed to shaft 1 and a sealing ring 5 having a sealing face 5a which is urged by means of springs (not shown), gas pressure, or oil pressure, or a combination of these, into sealing contact with the face of the collar 4. The sealing ring is free to move to follow axial movement of the shaft. Oil or other suitable sealing liquid is fed to the face 5a through duct 6 from space 7 in the enclosure wall 2, and flows radially across the sealing face in both inward and outward directions. Oil or other liquid flowing radially inward enters space 8 surrounding the shaft and from here it can pass along the shaft and would thus contaminate the gas in space 3. The thrust collar type of seal will be well known to those skilled in the art, as well as will the various possible arrangements for urging the sealing ring 5 sealingly against the radial face of the thrust collar 4. While the various fluid passages and accommodations for the sealing ring are shown in FIG. 1 as being formed in the enclosure wall, it will be readily apparent that these features could be formed in a special shaft housing, which in turn would be received in or otherwise supported by or attached to the enclosure wall. In many instances, it will be found to be more convenient and economical to form these passages and sealing accommodations in the enclosure wall itself as opposed to providing a separate removable housing.

A plurality of stationary radial baffles 9 are provided around the periphery of the shaft 1. As can be seen in FIG. 2, these baffles lie in planes which extend substantially in the direction of the shaft axis, that is, longitudinally of the shaft. While in FIG. 2 these planes are shown as being radial planes, they may lie at an angle to a radius. A small clearance, or running clearance, is lift between the radially inner end of each baffle sufficient to allow the shaft to rotate without rubbing contact. In most cases, these baffles can be integrally fixed in the wall or housing so as to cooperate with the shaft passing therethrough, but it will be understood by those skilled in the art that if desired the radial baffles 9 can be arranged so as to be adjustable over at least a limited radial distance, for instance by screws acting on their outer ends, or the like. In FIG. 1 there are shown two sets of such baffles 9 arranged one after the other in the direction of the shaft axis, but a single set or more than two sets can be used as desired.

The baffles 9 can be supplemented with a further or additional baffle or baffle-like member 10 in cases where a thrust collar type of seal is used. This further baffle 10 is similar to a labyrinth gland, but instead of acting in association with the shaft surface it acts in conjunction with the surface of the thrust collar as shown. With such an arrangement the clearance between the end of the baffle and the surface of the collar can be much smaller than in the case of a labyrinth gland associated with the shaft, as then the clearance must be at least equal to the shaft bearing clearances. While one such baffle-like member 10 is shown, several such members arranged one after the other can be disposed across the surface of the collar. This arrangement being much more efficient than the conventional labyrinth gland because of its smaller clearance provides an effective barrier to the passage of oil or other liquid radially inward along the surface of the collar. Oil or other liquid which passes this baffle arrangement enters space 8 and moves along the shaft until it enters a space 11 in which the baffles 9 are located. In the space 8 the oil or other liquid is caused to swirl by rotation of the shaft. This atomizes the oil, but contact with a baffle in space 11 separates oil from the gas in which it is entrained, and the oil collects on the baffles, from where it then drains from the space 11 via outlet 12.

Oil or other liquid collected by baffle-like member or members 10 collects in space 13 and passes to outlet 14. The baffle-like member or members 10 may form part of the sealing ring 5 or may be a separate member, as desired.

Figure 3:
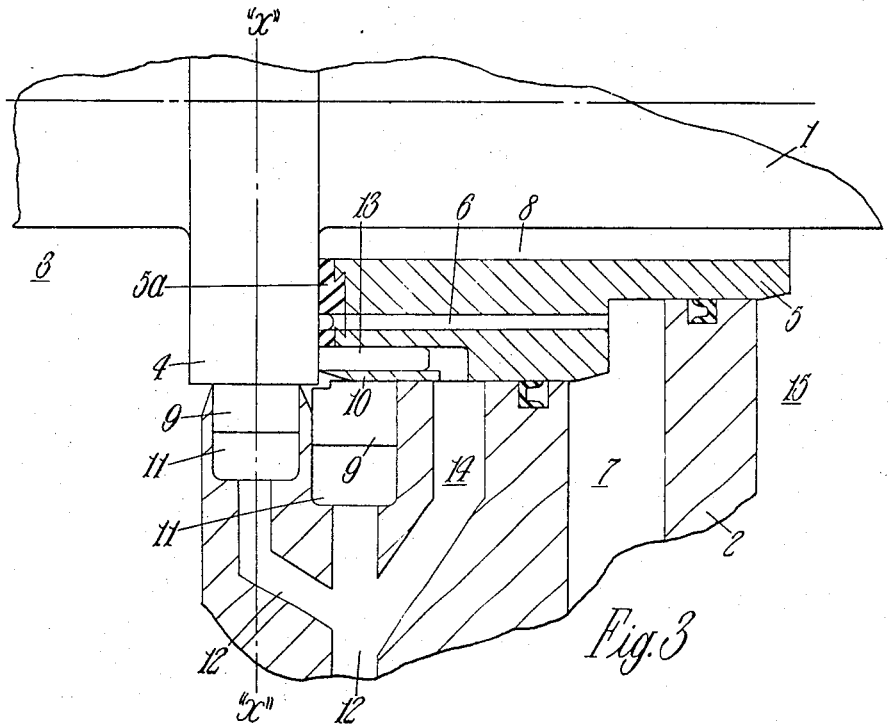
FIG. 3 is a fragmentary section through a modified sealing arrangement for a rotary shaft.

In the arrangement shown in FIG. 3 the sealing ring is on the side of the collar remote from the gas space 3, and in this case the baffles 9 are associated with the outer periphery of the collar, and also if desired with the outer periphery of the sealing ring 5 as shown. In addition, the baffle-like member or members 10 on the radially outer side of the sealing face 5a as shown.

Oil or other liquid leaking radially inward enters a space 8 as before, but this space is now open to atmosphere and is in communicatioin with a chamber 15 in which oil can be collected. Similar remarks apply to the arrangement of FIG. 1 in which oil passing radially outwards in this case is collected in a chamber 15 open to atmosphere.

Figure 4:
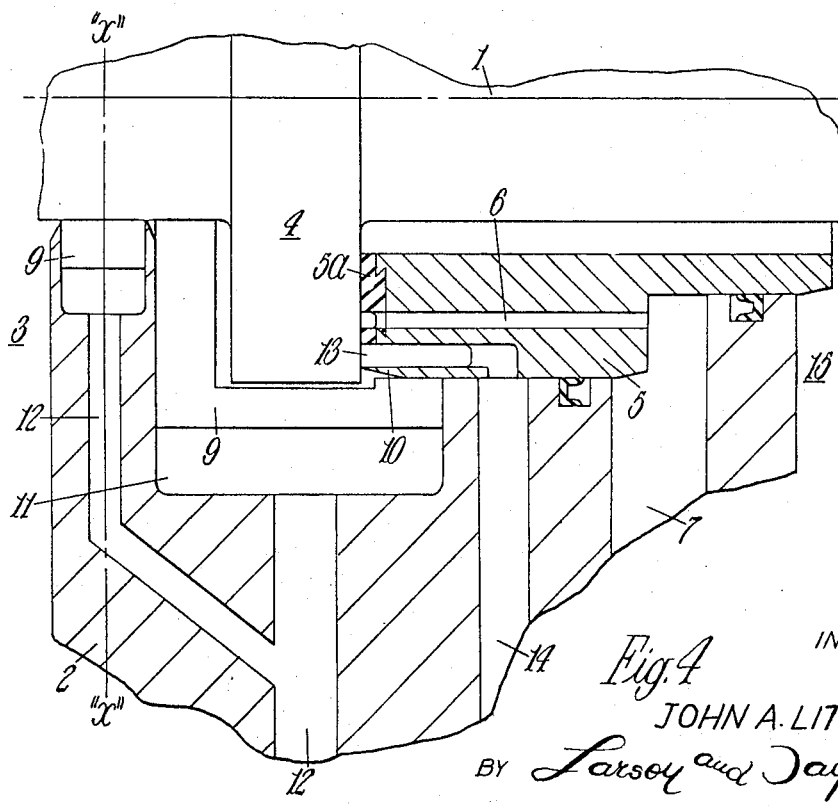
FIG. 4 is a fragmentary section of a sealing arrangement for a rotary shaft in accordance with a further form of the invention.

In a modification of the sealing arrangement of FIG. 3 as shown in FIG. 4, the baffles 9 not only act in association with the peripheral face of the collar 4 but are also associated with the shaft periphery on the side of the collar adjacent the gas space 3 as shown.

While in the above arrangements the baffles have been used in conjunction with a gas seal, their use is not dependent on the use of such a seal. They may form part of a shaft sealing arrangement which prevents or restricts the transfer of oil along a rotating shaft from a bearing. The sealing arrangement can be used in any system having a rotating shaft where it is necessary to prevent or reduce contamination of a gas in an encolsure by oil or other liquid. It could, for example, be used in gas-cooled dynamo-electric machines such as turbine driven alternators.

It will be readily apparent to those skilled in the art that the embodiments shown in the drawings and described in the specification are susceptible of various alterations or modifications without departing from the spirit of the invention. Accordingly, it should be understood that the embodiments shown and described herein are set forth only as exemplary of the invention, and not as limitations thereof. Rather the invention is as defined in the subjoined claims, as interpreted in the light of the foregoing specification and drawings.

Having thus fully described my invention in the manner required by the patent statutes, I claim:

1. A shaft sealing structure for minimizing the passage of fluid along a rotating shaft, comprising: a housing having a longitudinal passage therethrough for receiving a rotary shaft, sealing means supported in said housing for sealingly engaging a shaft which may pass through said longitudinal passage, a plurality of radial baffles in strip form supported in said housing and circumferentially spaced from one another around the periphery of said longitudinal passage and lying in planes extending substantially in the direction of the axis of said longitudinal passage, the radially inner edges of said baffles being disposed in said housing so as to extend longitudinally along and lie in close proximity to the periphery of a shaft which may pass through said longitudinal passage, and means for collecting oil or other fluid trapped by said baffles.

2. A shaft sealing structure as set forth in claim 1 wherein said radial baffles are disposed in a chamber surrounding said longitudinal passage, said chamber being formed in said housing and having an outer wall disposed outwardly from said longitudinal passage, the radially outer edges of said baffles being spaced inwardly from said outer wall of the chamber to provide an annular space surrounding the baffles, and said means for collecting trapped sealing fluid communicates with said annular space.

3. A shaft sealing structure for minimizing the passage of fluid along a rotating shaft, comprising: wall means having a rotary shaft passing therethrough, a housing surrounding said shaft, sealing means supported in said housing for sealingly cooperating with said shaft, a plurality of substantially planar radial baffles supported in said housing and lying in planes extending substantially in the direction of the axis of said shaft, said baffles being disposed in peripherally spaced relation from one another around the periphery of the shaft and having their radially inner edges extending longitudinally along and lying in close proximity to the periphery of said shaft, and means for collecting fluid trapped by said baffles.

4. A shaft sealing structure for minimizing the passage of fluid along a rotating shaft, comprising: a housing having a longitudinal passage therethrough for receiving a rotary shaft; a sealing ring carried by said housing, said sealing ring having a sealing face adapted for sealingly engaging a corresponding surface on a shaft passing through said housing, means for supplying a sealing fluid to said sealing face; a plurality of substantially planar radial baffles supported in said housing, peripherally spaced from each other around the circumference of said longitudinal passage, and lying in planes extending substantially in the direction of the axis of said longitudinal passage, the radially inner edges of said baffles being disposed in said housing so as to extend longitudinally along and lie in close proximity to the periphery of a shaft passing through said longitudinal passage; and means for collecting sealing fluid trapped by said baffles.

5. Apparatus as set forth in claim 4 wherein said sealing face of said sealing ring faces transversely to the axis of said longitudinal passage so as to be sealingly engageable with a corresponding transversely disposed face on a collar of a shaft passing through said housing.

6. Apparatus as set forth in claim 5 further comprising at least one additional baffle adjacent to said sealing ring and having a small clearance with a transversely disposed face on a collar of a shaft passing through said housing at a point between said sealing face and said first mentioned radial baffles.

7. Apparatus as set forth in claim 5 wherein at least some of said radial baffles are disposed so as to lie around the periphery of a thrust collar on a shaft passing through said housing.

8. In a shaft sealing structure for reducing contamination of gas in an enclosure by fluid passing along a rotating shaft passing through a wall of the enclosure, said sealing structure comprising a sealing ring supported by the wall in sealing engagement with a corresponding surface on a fixed collar of the shaft, and means for supplying sealing fluid to the face of the sealing ring, the improvement comprising: a plurality of substantially flat radial baffles supported by said wall and lying in planes extending substantially in the direction of the shaft axis, said baffles being disposed in peripherally spaced relation around the periphery of said shaft on the enclosure side of said sealing ring, and means for collecting sealing fluid trapped by said baffles.

9. Apparatus as set forth in claim 7 further comprising at least one additional baffle supported by said wall and having a small clearance with a radial face of said shaft collar between said sealing ring and said first mentioned radial baffles.

References Cited

UNITED STATES PATENTS

| | | | |
|---|---|---|---|
| 1,315,822 | 9/1919 | Doran | 277—74 |
| 2,426,461 | 8/1947 | Lyddon | 277—53 |
| 2,895,751 | 7/1959 | Standish | 277—3 |

FOREIGN PATENTS 1,254,180  9/1961  France.

SAMUEL ROTHBERG, *Primary Examiner.*